United States Patent
Oikawa

(10) Patent No.: US 8,256,545 B2
(45) Date of Patent: Sep. 4, 2012

(54) COAXIAL TWO-WHEEL VEHICLE AND METHOD OF CONTROLLING THE SAME

(75) Inventor: Susumu Oikawa, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 556 days.

(21) Appl. No.: 12/522,230

(22) PCT Filed: Sep. 17, 2008

(86) PCT No.: PCT/JP2008/066713
§ 371 (c)(1),
(2), (4) Date: Jul. 6, 2009

(87) PCT Pub. No.: WO2009/054208
PCT Pub. Date: Apr. 30, 2009

(65) Prior Publication Data
US 2010/0038163 A1    Feb. 18, 2010

(30) Foreign Application Priority Data
Oct. 22, 2007    (JP) .................................. 2007-273544

(51) Int. Cl.
B60K 1/00    (2006.01)
(52) U.S. Cl. .................... 180/65.1; 180/181; 180/218
(58) Field of Classification Search ............. 180/65.1, 180/180, 181, 218, 219, 220; 701/22, 70, 701/116, 124
See application file for complete search history.

(56) References Cited

U.S. PATENT DOCUMENTS

| 7,178,614 | B2 * | 2/2007 | Ishii ............................... 180/7.1 |
| 7,810,591 | B2 * | 10/2010 | Yamano ........................ 180/65.1 |
| 7,866,429 | B2 * | 1/2011 | Ishii et al. ..................... 180/218 |

FOREIGN PATENT DOCUMENTS

| JP | 2003-502002 A | 1/2003 |
| JP | 2005-094898 A | 4/2005 |
| JP | 2005-335677 A | 12/2005 |
| JP | 2006-001384 A | 1/2006 |
| JP | 2006-001385 A | 1/2006 |
| JP | 2006-315666 A | 11/2006 |
| JP | 2007-153024 A | 6/2007 |
| JP | 2008-238981 A | 10/2008 |
| WO | WO 2007/088944 A1 | 8/2007 |

OTHER PUBLICATIONS

Office Action mailed Mar. 29, 2011 in JP 2007-273544 and English translation thereof.

* cited by examiner

*Primary Examiner* — John Walters
(74) *Attorney, Agent, or Firm* — Kenyon & Kenyon LLP

(57) ABSTRACT

To provide a coaxial two-wheel vehicle that allows a person to easily get off the vehicle with high safety, and a method of controlling the same. A coaxial two-wheel vehicle according to the present invention includes step portions on which feet are placed, and a handle capable of operating back-and-forth movements, and said vehicle moves with a passenger riding thereon. Upon detecting that the passenger gets off the vehicle by using a getting-off switch or the like, a control device of the coaxial two-wheel vehicle performs an assist control for getting-off the vehicle by increasing an inclination angle of each of the step portions with respect to a direction in which the passenger gets off the vehicle.

20 Claims, 8 Drawing Sheets

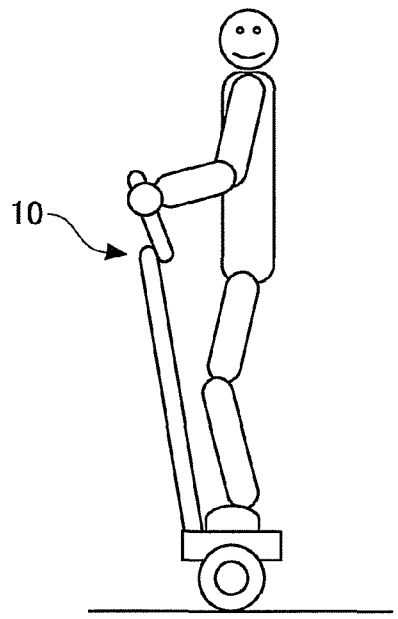
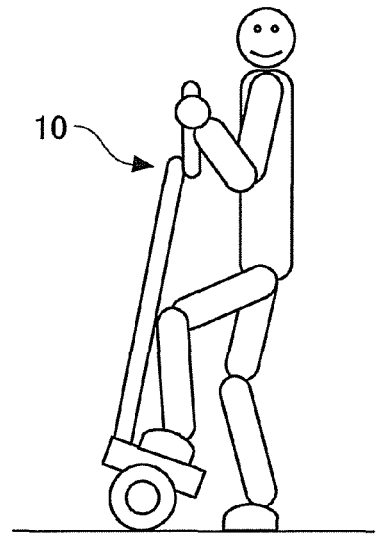
Fig. 1A
Fig. 1B
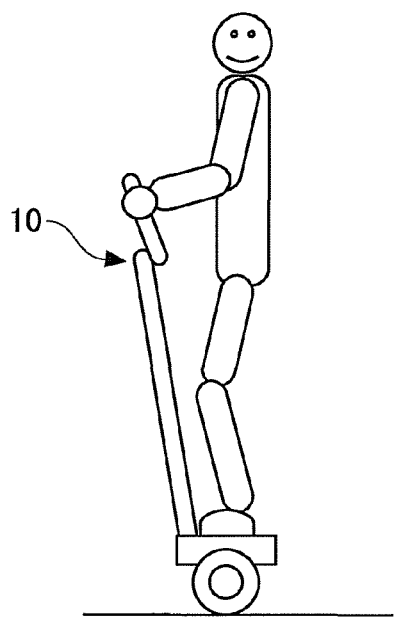
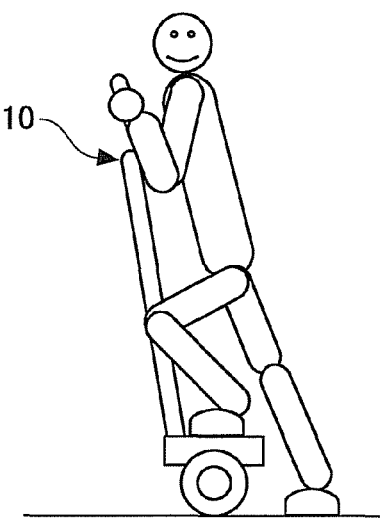
Fig. 2A
Fig. 2B

COAXIAL TWO-WHEEL VEHICLE AND METHOD OF CONTROLLING THE SAME

This is a 371 national phase application of PCT/JP2008/066713 filed 17 Sep. 2008, claiming priority to Japanese Patent Application No. JP 2007-273544 filed 22 Oct. 2007, the contents of which are incorporated herein by reference.

TECHNICAL FIELD

The present invention relates to a coaxial two-wheel vehicle including two wheels disposed on the same axis center line, and a method of controlling the same. In particular, the present invention relates to a coaxial two-wheel vehicle with a person riding thereon to perform a traveling operation, and a method of controlling the same.

BACKGROUND ART

An example of coaxial two-wheel vehicles in the related art is disclosed in Patent Document 1. Patent Document 1 proposes a coaxial two-wheel vehicle having a vehicle structure in which a user gets on the vehicle in a standing posture. In the coaxial two-wheel vehicle disclosed in Patent Document 1, operations such as forward/backward movements and left/right turns are performed in response to instructions resulting from movement of a handle, movement of the center of gravity of a passenger, inclination of a step on which the passenger rides, and the like, thereby steering the vehicle. Further, this coaxial two-wheel vehicle is unstable in a front-and-rear direction because of its structure, like other common coaxial two-wheel vehicles. Accordingly, wheels of the vehicle are controlled through feedback control by using a posture sensor to thereby stabilize the vehicle.

[Patent Document 1] Japanese Unexamined Patent Application Publication No. 2006-315666

DISCLOSURE OF INVENTION

Technical Problems

A coaxial two-wheel vehicle performs a posture (balance) control by using a posture sensor or the like in the manner as described above, while the coaxial two-wheel vehicle is liable to lose its balance when a passenger gets on or gets off the vehicle, according to the nature of the balance control. In order to prevent the vehicle from losing its balance, the passenger is forced to carefully get on/off the vehicle in an unnatural posture.

In other words, when the passenger tries to get off the coaxial two-wheel vehicle and moves his or her foot backward in a state where the balance control according to the related art is carried out, the center of gravity of the passenger is moved backward, with the result that the vehicle starts traveling backward. If the passenger forcibly places one foot on the ground while ignoring the backward traveling operation, the vehicle traveling backward may collide with the foot.

Accordingly, in the coaxial two-wheel vehicle in the related art having a balance control mechanism, the passenger is forced to get off the vehicle in an unnatural posture while keeping balance by inclining the upper body forward by himself/herself in order to prevent the vehicle from traveling backward in the case where one foot is moved backward when the passenger gets off the vehicle.

The present invention has been made to solve the above-mentioned problems, and therefore an object of the present invention is to provide a coaxial two-wheel vehicle that allows a person to easily get off the vehicle with high safety, and a method of controlling the same.

Technical Solution

According to the present invention, there is provided a coaxial two-wheel vehicle having step portions on which feet of the passenger are placed and an operating portion capable of operating at least back-and-forth movements, to move with a passenger riding thereon, the coaxial two-wheel vehicle including a control device that executes a getting-off assist control to increase an inclination angle of each of the step portions with respect to a direction in which the passenger gets off the vehicle, when the passenger gets off the vehicle.

Here, in the coaxial two-wheel vehicle, when the step portions are inclined in a front-and-rear direction by the operating portion, the control device controls the coaxial two-wheel vehicle to move in a direction in which the step portions are inclined.

Further, when a moving direction of the coaxial two-wheel vehicle coincides with a direction in which the passenger gets off the vehicle, the step portions may be inclined to a side of the moving direction after being inclined in a direction opposite to the moving direction.

Furthermore, the coaxial two-wheel vehicle further includes a getting-off switch that generates a getting-off control start trigger signal, and it is preferable that the control device detect that the passenger gets off the vehicle, in response to the getting-off control start trigger signal supplied from the getting-off switch, and execute the getting-off assist control.

Furthermore, the coaxial two-wheel vehicle further includes a step sensor that detects whether the feet of the passenger are placed on the step portions, and the control device may detect a getting-off operation of the passenger based on a detection result of the step sensor, and may execute the getting-off assist control.

Furthermore, it is preferable that the control device increase the inclination angle of each of the step portions by changing a target posture angle.

It is preferable that the control device change the target posture angle smoothly by using a digital low-pass filter to increase the inclination angle of each of the step portions.

Further, the control device may change the target posture angle along a curve obtained by combining a plurality of quadratic or higher order curves to increase the inclination angle of each of the step portions.

Furthermore, when the control device detects that a speed of the coaxial two-wheel vehicle is zero, it is preferable that the control device stop a posture control and control a drive motor for wheels to maintain the coaxial two-wheel vehicle in a stopped state.

Furthermore, it is preferable that the control device control the drive motor to change a driving speed along a quadratic or higher order curve so that the coaxial two-wheel vehicle is brought into a completely stopped state.

Further, the coaxial two-wheel vehicle further includes means that detects that both feet of the passenger are removed from the step portions, and when the control device detects the both feet of the passenger are removed from the step portions, it is desirable that the control device stop controlling a drive motor for wheels.

According to the present invention, there is provided a method of controlling a coaxial two-wheel vehicle including step portions on which feet of a passenger are placed and an operating portion capable of operating at least back-and-forth movements, to move with the passenger riding thereon, the method including the steps of: detecting that the passenger gets off the vehicle; and executing a getting-off assist control to increase an inclination angle of each of the step portions with respect to a direction in which the passenger gets off the vehicle, when it is detected that the passenger gets off the vehicle.

Here, when the step portions are inclined in a front-back direction by the operation portion, it is preferable that the coaxial two-wheel vehicle be controlled to move in a direction in which the step portions are inclined.

Further, when a moving direction of the coaxial two-wheel vehicle coincides with a direction in which the passenger gets off the vehicle, the step portions may be inclined to a side of the moving direction after being inclined in a direction opposite to the moving direction.

Further, it is preferable that the inclination angle of each of the step portions be increased by changing a target posture angle.

Furthermore, the target posture angle may be changed smoothly by using a digital low-pass filter to increase the inclination angle of each of the step portions.

Further, the inclination angle of each of the step portions may be increased by changing the target posture angle along a curve obtained by combining a plurality of quadratic or higher order curves.

Here, when it is detected that a speed of the coaxial two-wheel vehicle is zero, a posture control may be stopped and a drive motor for wheels may be controlled to maintain the coaxial two-wheel vehicle in a stopped state.

Further, it is preferable that the drive motor be controlled to change a driving speed along a quadratic or higher order curve so that the coaxial two-wheel vehicle is brought into a completely stopped state.

Furthermore, when it is detected that both feet of the passenger are removed from the step portions, it is preferable that control of the drive motor for wheels be stopped.

Advantageous Effects

According to the present invention, it is possible to provide a coaxial two-wheel vehicle that allows a person to easily get off the vehicle with high safety, and a method of controlling the same.

BRIEF DESCRIPTION OF DRAWINGS

FIG. 1A is an explanatory view illustrating a control operation of a coaxial two-wheel vehicle according to a first embodiment of the present invention;

FIG. 1B is an explanatory view illustrating the control operation of the coaxial two-wheel vehicle according to the first embodiment of the present invention;

FIG. 2A is a diagram illustrating an operation for getting off the coaxial two-wheel vehicle when the present invention is not carried out;

FIG. 2B is a diagram illustrating an operation for getting off the coaxial two-wheel vehicle when the present invention is not carried out;

EXPLANATION OF REFERENCE

Figure 3A:
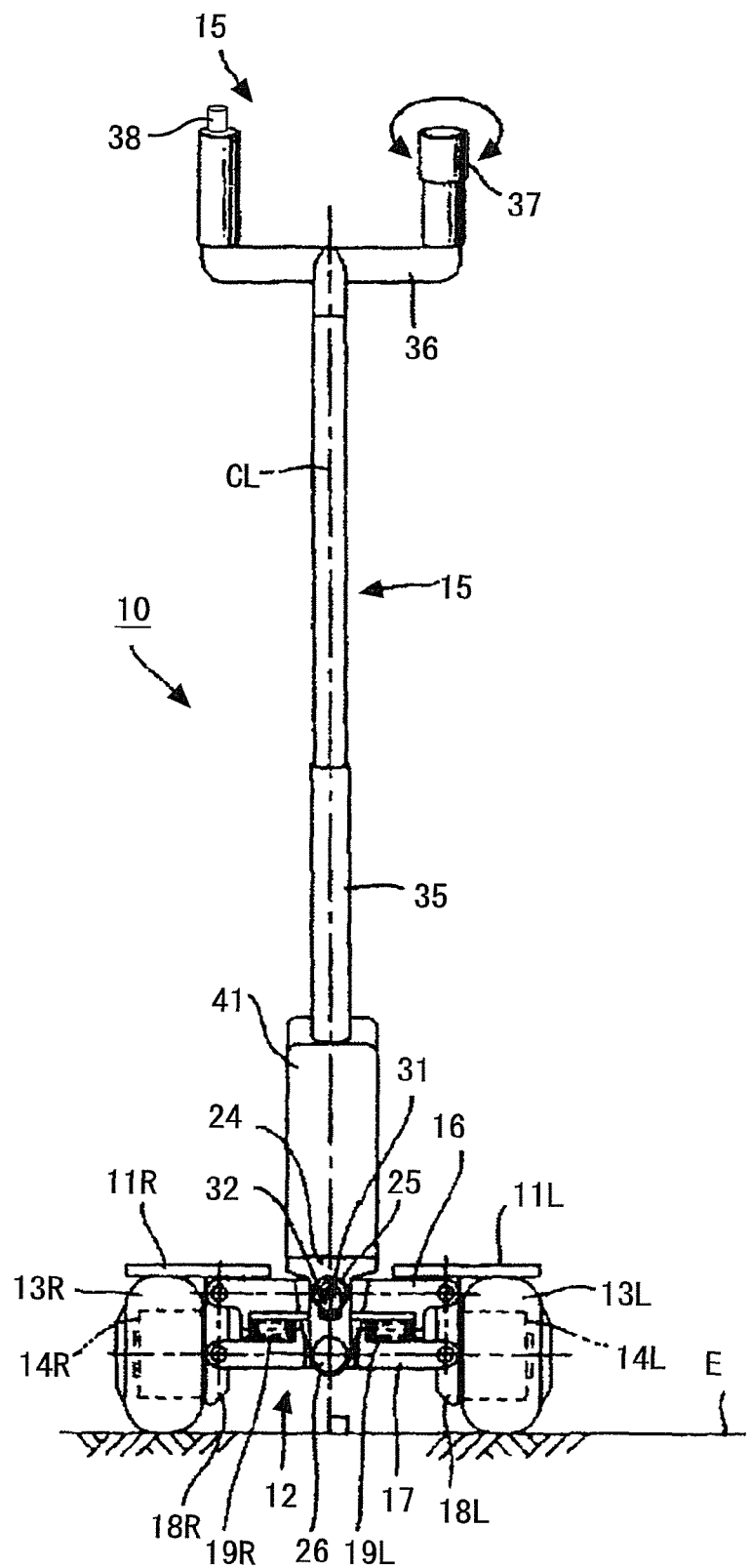
FIG. 3A is a front view of the coaxial two-wheel vehicle according to the first embodiment of the present invention.

10 coaxial two-wheel vehicle
11L, 11R step portion
12 vehicle body
13L, 13R wheel
14L, 14R wheel drive unit
15, handle
16 vehicle body upper member
18L, 18R side surface member
24 operating lever bracket
25 upper-front turning support axle
26 lower-front turning support axle
31 angle detection sensor
32 fixing plate
38 getting-off switch
39 step sensor
40 battery (power-supply accommodating portion)
41 power supply cover
44L, 44R drive circuit
45 posture sensor unit
46 control device
47 arithmetic circuit
48 storage device
49 emergency stop switch

BEST MODES FOR CARRYING OUT THE INVENTION

First Embodiment

First, the outline of a method of controlling a coaxial two-wheel vehicle according to the present invention will be described with reference to explanatory views. In particular, the coaxial two-wheel vehicle according to the present invention has a feature of performing a getting-off assist control for assisting a getting-off operation when a passenger gets off the vehicle. FIGS. 1A and 1B are views each illustrating the control method according to the present invention. Each of the views illustrates a state where the passenger gets off the coaxial two-wheel vehicle on the rear side thereof.

Further, the coaxial two-wheel vehicle according to this embodiment is a coaxial two-wheel vehicle of a so called handle operated type. Operations such as forward/backward movements and left/right turns can be performed by tilting a handle extending upward from a vehicle body. Specifically, the forward moving operation is performed when the handle is tilted forward; the backward moving operation is performed when the handle is tilted backward; and the turning operation is performed when the handle is tilted leftward or rightward. A movement control operation performed using a handle is disclosed in, for example, Patent Document 1.

FIG. 1A shows a state where the passenger gripping the handle is on the coaxial two-wheel vehicle. In this state, the center of gravity of the vehicle is coincident with the center of gravity of the passenger, and thus the vehicle is balanced. FIG. 1B shows a state which is shifted from the state shown in FIG. 1A and in which the passenger gets off the vehicle on the rear side thereof and puts his/her right foot on the ground.

If the vehicle is stopped in the balanced state while the passenger is on the vehicle as shown in FIG. 1A, it can be said that, in the case where the passenger gets off the vehicle as shown in FIG. 1B, the most natural getting-off posture is achieved when the vehicle moves forward by several tens of centimeters from the original position and the center of gravity of the passenger is shifted backward to a position several centimeters away from the original position. In the getting-off assist control according to the present invention, a step of the vehicle is inclined to the rear side of the vehicle as shown in FIG. 1B. Here, a movement distance between the center of gravity of the vehicle and the center of gravity of the passenger is determined according to a ratio between the weight of the vehicle and the weight of the passenger.

FIGS. 2A and 2B each show a case where the getting-off assist control according to the present invention is not carried out and the getting-off operation is not assisted. FIG. 2A shows a state where the passenger gripping the handle is on the coaxial two-wheel vehicle. FIG. 2B shows a state which is shifted from the state shown in FIG. 2A and in which the passenger gets off on the rear side of the vehicle and puts his/her right foot on the ground. In this case, the positions of tires of the vehicle on the ground remain unchanged before and after the passenger gets off the vehicle. As a result, the passenger takes an unnatural and undesirable posture, that is, a posture in which one foot (hereinafter, referred to as "grounding leg") of the passenger is placed on the ground while the center of gravity of the passenger is located immediately above the vehicle, and then moves the other foot (hereinafter, referred to as "supporting leg") from the step to place the supporting leg on the ground, thereby completing the getting-off operation.

On the other hand, in the state shown in FIG. 2A, it is also possible to perform control for stopping balance control during the getting-off operation to stop a motor for driving wheels. When such a control is performed, however, it is unpredictable that the vehicle overturns forward or backward. As a result, there may be a fear that the passenger is unable to determine to which side he/she gets off the vehicle.

As a result of the keen study, the inventors of the present invention have found that the reason for various problems occurring during the getting-off operation is that the same balance (posture) control, which is performed when the passenger is on the vehicle in the normal state (that is, during traveling), is continued during the getting-off operation. The term "getting-off operation" originally refers to an operation of shifting from a balanced state to an unbalanced state between the center of gravity of the vehicle and the center of gravity of the passenger. Thus, the getting-off operation is incompatible with the operation of performing control so as "not to lose its balance" during traveling.

As shown in FIGS. 1A and 1B, the center of gravity of each of the vehicle and the passenger is located immediately above the tires when the passenger is on the vehicle. After the passenger gets off the vehicle on the rear side thereof, it is necessary to change the positional relationship so that the vehicle is positioned forward and the passenger is positioned backward. In the balanced control employed in the coaxial two-wheel vehicle according to the related art, it is assumed that the center of gravity of the vehicle is coincident with the center of gravity of the passenger. Thus, the balance control cannot be applied to a transient state in which the centers of gravity are located forward and backward as in the case where the passenger gets off the vehicle.

In this regard, according to the control method of the present invention, an inclination angle of each of the steps is first increased during the getting-off operation. For example, when the passenger gets off the vehicle on the front side thereof, a forward inclination angle of each of the steps is increased, and when the passenger gets off the vehicle on the rear side thereof, a backward inclination angle of each of the steps is increased.

Figure 3B:
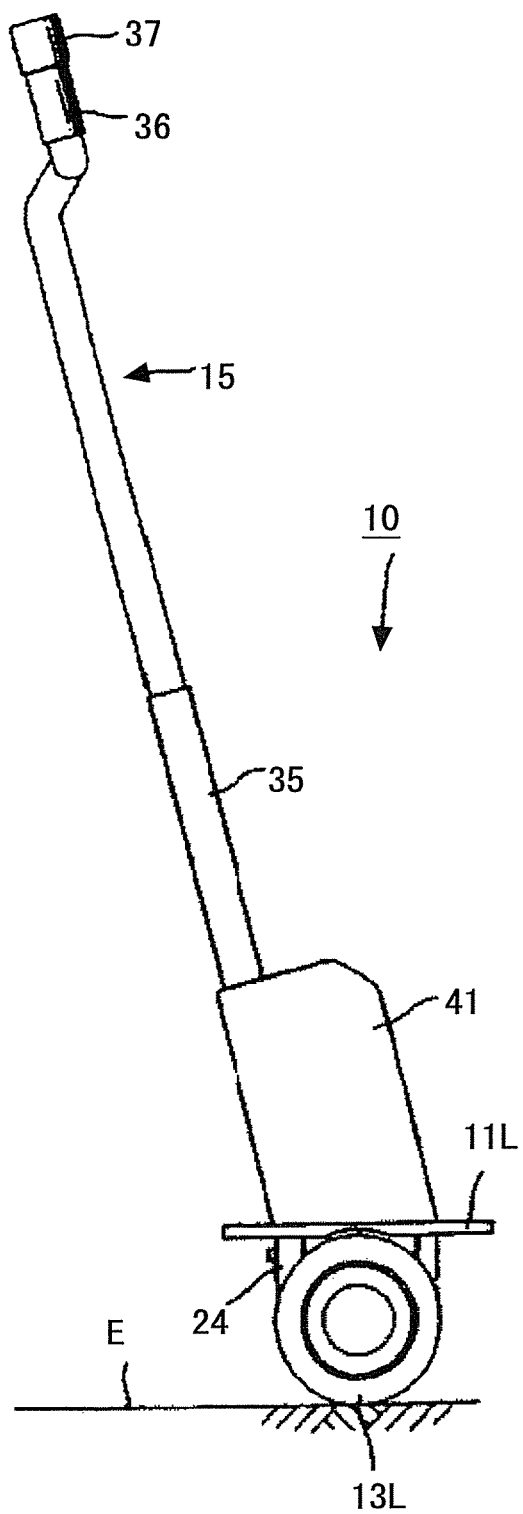
FIG. 3B is a side view of the coaxial two-wheel vehicle according to the first embodiment of the present invention.

Next, the structure of the coaxial two-wheel vehicle according to this embodiment will be described with reference to FIGS. 3A and 3B. The structure of the coaxial two-wheel vehicle is similar to that described in the above-mentioned Patent Document 1 except for the control means. It is assumed herein that a pitch axis is an axis corresponding to an axle of a pair of wheels 13L and 13R; a roll axis is an axis which passes through the center of a vehicle body 12 and is parallel to a traveling direction of the vehicle; and a yaw axis is an axis which passes through the center of the vehicle body 12 and is vertical to a road surface on which the vehicle travels.

A coaxial two-wheel vehicle 10 includes the vehicle body 12, the wheels 13L and 13R, wheel drive units 14L and 14R, and a handle 15.

The handle 15 is an operating portion for performing forward/backward movement operations by tilting the handle in the back and forth direction, and for performing a turning operation by tilting the handle in the roll direction. A lower end portion of the handle 15 is fixed to an operating lever bracket 24. Specifically, the handle 15 is composed of a handle post 35 and a handle lever 36 formed on an upper end portion of the handle post 35.

On an upper end portion of one of protrusions of the handle lever 36, a turning operation ring 37 capable of controlling the driving of the pair of wheel drive units 14L and 14R is mounted. The turning operation ring 37 is used to control the turning operation of the vehicle through a manual operation, and acts as an accelerator ring for use in the turning operation. When a driver turns the turning operation ring 37 in a desired direction in which the driver intends to turn the vehicle, a signal corresponding to an operation amount of the turning operation ring 37 is output to a control device described later. As a result, a control device 46 controls the driving of the pair of wheel drive units 14L and 14R according to the operation amount of the turning operation ring 37 to produce a difference in rotation between the left and right wheels 13L and 13R, thereby enabling the vehicle to turn at a desired speed.

On an upper end portion of the other of the protrusions of the handle lever 36, a getting-off switch 38 is provided. The getting-off switch 38 is a switch that generates a getting-off assist start trigger signal which triggers execution of the getting-off assist control that is a characteristic processing of the present invention. When the passenger presses the getting-off switch 38, the getting-off assist start trigger signal is supplied to the control device 46. The control device 46 starts the execution of the getting-off assist control in response to the getting-off assist start trigger signal.

The vehicle body 12 rotatably supports the handle 15 in the roll direction.

The pair of wheels 13L and 13R are disposed on the same axis line on both sides of the vehicle body 12 in a direction orthogonal to the traveling direction, and are rotatably supported by the vehicle body 12.

The wheel drive units 14L and 14R are wheel drive means that rotationally drive the pair of wheels 13L and 13R individually.

On the upper surface of the vehicle body 12, two step portions 11L and 11R are provided on the left and right sides of the handle 15. The step portions 11L and 11R are steps for the passenger to ride with the feet being respectively placed thereon, and are formed of a pair of plate bodies, each of which is formed with a size equivalent to or a little larger than the sole of a person's foot. The step portions 11L and 11R are respectively provided with step sensors 39L and 39R. The step sensors 39L and 39R are each formed of, for example, a weight sensor, and detect whether the feet of the passenger are respectively placed on the step portions 11L and 11R. When the feet are placed on the step portions, the step sensors 39L and 39R each supply a foot detection signal to the control device 46. The control device 46 is capable of detecting whether one foot of the passenger is placed on one of the step portions 11L and 11R, or the feet of the passenger are placed on both of the step portions 11L and 11R.

The vehicle body 12 has a parallel link structure disclosed in Patent Document 1. The vehicle body 12 is structured as a parallel link mechanism including a vehicle body upper member 16 and a vehicle body lower member 17, which are disposed vertically in parallel with each other, and a pair of side surface members 18L and 18R which are disposed horizontally in parallel with each other and which are rotatably connected to each of the vehicle body upper member 16 and the vehicle body lower member 17. Between the vehicle body upper member 16 and the vehicle body lower member 17 of the parallel link mechanism, a pair of coil springs 19L and 19R, which generate a spring force to maintain angles formed between the vehicle body upper member 16 and the vehicle body lower member 17 and the pair of side surface members 18L and 18R, respectively, at a right angle, are interposed.

The wheel drive units 14L and 14R are respectively attached to outer surfaces of the pair of side surface members 18L and 18R. The wheel drive units 14L and 14R can be composed of, for example, a drive motor and a reduction gear train connected to a rotating shaft of the drive motor in a power transmitting manner. The wheel drive units 14L and 14R are each composed of a fixation portion, which is fixed to each of the side surface members 18L and 18R, and a rotation portion which is rotatably supported by the fixation portion. Each of the pair of wheels 13L and 13R is mounted to the rotation portion. When the pair of wheels 13L and 13R, which are respectively supported by the pair of side surface members 18L and 18R through the pair of wheel drive units 14L and 14R in the manner as described above, are located on an even road surface, the rotation centers of the pair of wheels 13L and 13R coincide with each other on the same axis center line.

Further, upper end portions of the pair of side surface members 18L and 18R are projected appropriately upward from the upper surface of the vehicle body upper member 16, and the step portions 11L and 11R are individually attached to the upper end surfaces thereof. The pair of step portions 11L and 11R are provided horizontally extending at the same height with a predetermined gap in between in the left-and-right direction that is an axle direction. The distance between the pair of step portions 11L and 11R is made to be a distance between both feet when a person is standing in a natural state.

Further, the operating lever bracket 24 is attached to the center portion in the left-and-right direction of the vehicle body upper member 16 and the vehicle body lower member 17. The operating lever bracket 24 is made of a saddle-shaped member formed to straddle the vehicle body upper member 16 in the front-and-rear direction. A front surface portion extending to the lower portion of the vehicle body lower member 17 is provided at the front portion, and a rear surface portion extending close to the lower portion of the vehicle body upper member 16 is provided at the rear portion. Further, a fitting portion for fixing and supporting the handle post 35 is provided on the upper surface of the operating lever bracket 24. In the front surface portion of the operating lever bracket 24, bearing holes are provided respectively at positions corresponding to a front-center bearing hole of the vehicle body upper member 16 and to a center bearing hole of the vehicle body lower member 17. Further, in the rear surface portion, a bearing hole is provided at a position corresponding to a rear-center bearing hole of the vehicle body upper member 16.

An upper-front turning support axle 25 is fitted into the upper-center bearing hole of the front surface portion of the operating lever bracket 24 in a turnable manner. Further, an upper-rear turning support axle (not shown) is fitted into the center bearing hole of the rear surface portion in a turnable manner. An axle center line of the upper-front turning support axle 25 and an axle center line of the upper-rear turning support axle are set on the same axis to correspond with each other. An axle top end portion of the upper-front turning support axle 25 is fitted into the hole provided in the front surface of the vehicle body upper member 16, and is fastened to be fixed with a fixing screw penetrating through the front surface of the vehicle body upper member 16. Likewise, an axle top end portion of the upper-rear turning support axle is fitted into the hole provided in the rear surface of the vehicle body upper member 16, and is fastened to be fixed with a fixing screw penetrating through the rear surface of the vehicle body upper member 16.

A lower-front turning support axle 26 is fitted into the lower-center bearing hole of the front surface portion of the operating lever bracket 24 in a turnable manner. The operating lever bracket 24 is turned in the roll direction with the lower-front turning support axle 26 as the center of turning. To allow the turning of the operating lever bracket 24 within a predetermined range, concave cavity portions for avoiding contact with the operating lever bracket 24 are provided in the front surfaces of the vehicle body upper member 16 and the vehicle body lower member 17. Furthermore, an angle detection sensor 31 is attached to the upper-front turning support axle 25 to detect an operation amount (turning amount) of the handle 15 through the turning amount (turning angle) of the operating lever bracket 24 in the roll direction.

The angle detection sensor 31 includes an axle portion fixed to the upper-front turning support axle 25, and a detection portion that detects an amount of relative rotational displacement from the axle portion. The detection portion is fixed to one end of a fixing plate 32, and the other end of the fixing plate 32 is fixed to the front surface portion of the operating lever bracket 24 with a fixing screw. A potentiometer, a sensor having a variable capacitor structure, and the like can be applied as the angle detection sensor 31, for example. A lower end portion of the handle 15 is fixed to the fitting portion of the operating lever bracket 24.

A power-supply accommodating portion 40 accommodating a battery that is a specific example of a power supply for supplying electric power to the pair of wheel drive units 14L and 14R, the control device, the other electronic devices and electric apparatus, and the like is provided on the upper surface of the operating lever bracket 24 that is a base portion of the handle 15. The power-supply accommodating portion 40 is covered with a power supply cover 41.

Drive circuits for driving the pair of wheel drive units 14L and 14R and the like are incorporated in a housing portion of the vehicle body upper member 16. Further, the vehicle body lower member 17 is provided with a posture sensor unit serving as a posture detecting means that detects the posture of the vehicle body 12, the handle 15, and the like to output detection signals thereof, and with the control device 46 that outputs control signals for driving and controlling the pair of wheel drive units 14L and 14R and the like. The control device 46 executes predetermined arithmetic processing based on the detection signal from a posture sensor unit 45, the detection signal from the angle detection sensor 31, the getting-off assist start trigger signal from the getting-off switch 38, the foot detection signal from the step sensor 39, and the like, and outputs necessary control signals to the pair of wheel drive units 14L and 14R and the like.

Figure 4:
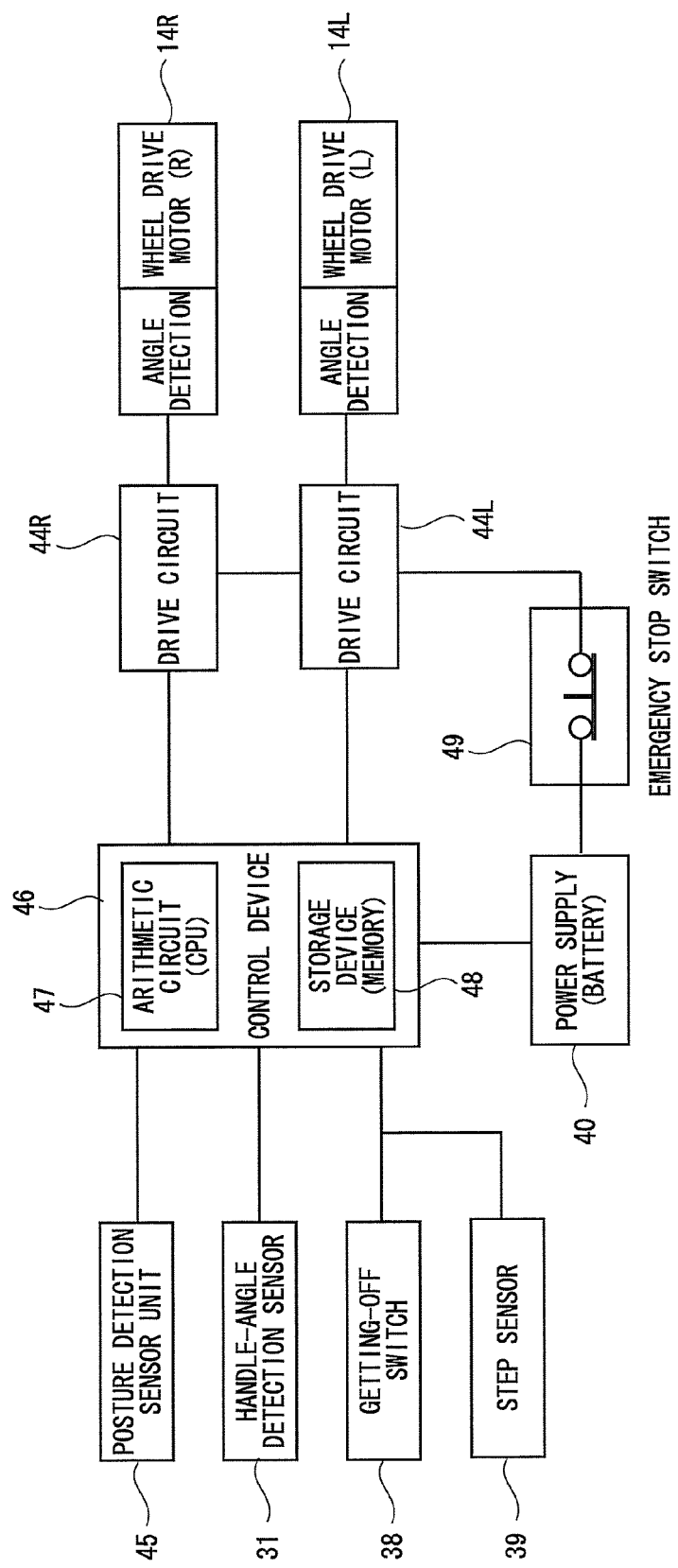
FIG. 4 is a block diagram showing a schematic structure of a control portion of the coaxial two-wheel vehicle according to the first embodiment of the present invention.

As shown in FIG. 4, the control device 46 includes an arithmetic circuit 47 having a microcomputer (CPU), and a storage device 48 having a program memory, a data memory, and other memories such as a RAM and a ROM, for example. The battery 40 and a pair of drive circuits 44L and 44R are connected to the control device 46, and those are also connected to each other through an emergency stop switch 49. The pair of drive circuits 44L and 44R individually control a rotational speed, a rotational direction, and the like of the pair of wheels 13L and 13R, and the pair of wheel drive units 14L and 14R are individually connected thereto.

The control device 46 is supplied with the detection signal from the angle detection sensor 31 that detects the inclination angle of the handle 15, the detection signal from the posture sensor unit 45, the getting-off assist start trigger signal from the getting-off switch 38, and the foot detection signal from the step sensor 39. The control device 46 executes the getting-off assist control as well as the normal posture control based on the getting-off assist start trigger signal and the foot detection signal.

The posture sensor unit 45 is used to detect an angular velocity and an acceleration and to control the angular velocity and travel acceleration when the coaxial two-wheel vehicle 10 is traveling, and is composed of, for example, a gyroscopic sensor and an acceleration sensor. When the handle 15 is tilted forward or backward, the step portions 11L and 11R are inclined in the same direction, and the posture sensor unit 45 detects the angular velocity and the acceleration corresponding to the inclination. Further, the control device 46 drives and controls the wheel drive units 14L and 14R based on the angular velocity and the acceleration, which are detected by the posture sensor unit 45, so that the vehicle moves in a direction in which the handle 15 is tilted.

Figure 5:
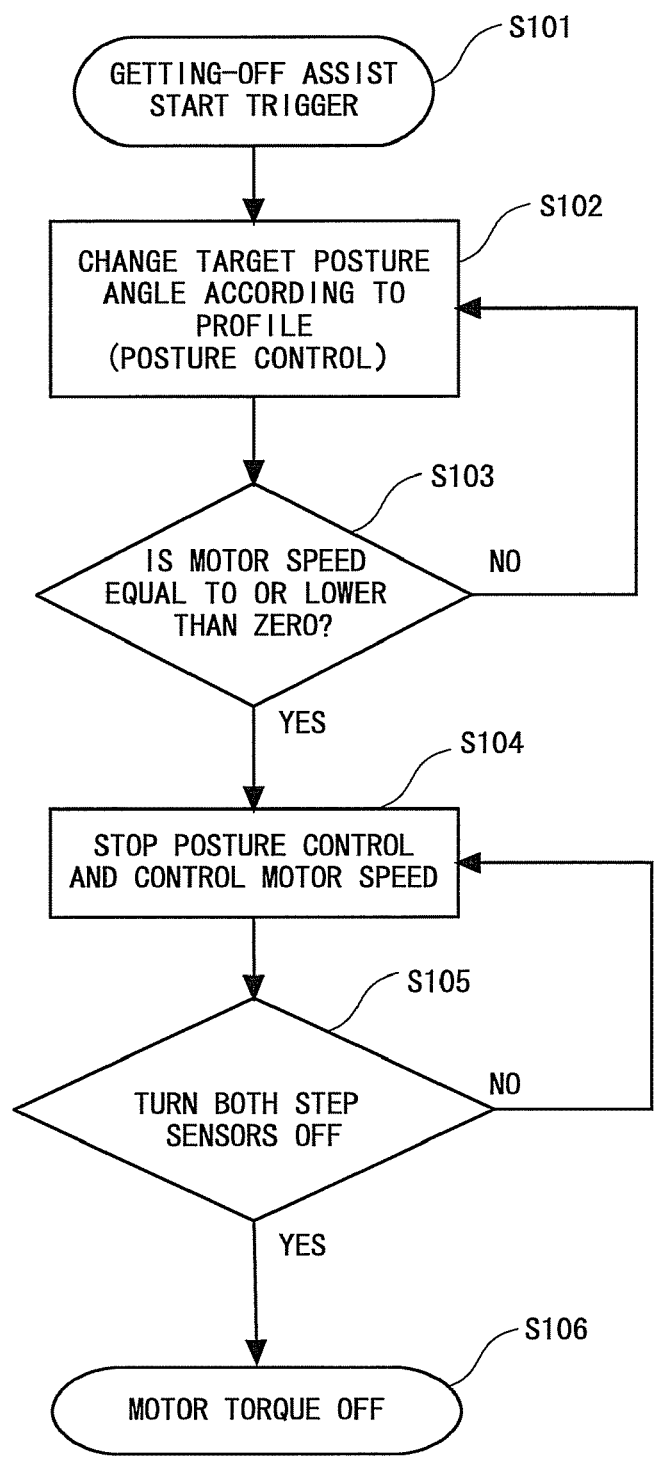
FIG. 5 is a flowchart showing a flow of control of the coaxial two-wheel vehicle according to the first embodiment of the present invention.

Next, the control method according to this embodiment, that is, the getting-off assist control will be described with reference to the flowchart shown in FIG. 5.

The getting-off assist control according to this embodiment is started in response to the getting-off assist start trigger indicating that the passenger starts to get off the vehicle in a state where the passenger riding thereon is carrying out the posture control (S101). Specifically, when the passenger presses the getting-off switch 38, the getting-off assist start trigger signal is supplied to the control device 46 in response to the switch being pressed, thereby notifying the control device 46 of the getting-off assist start trigger. The control device 46 starts the getting-off assist control in response to the getting-off assist start trigger signal.

Here, the getting-off assist start trigger can be generated not only by the control due to pressing of the getting-off switch 38, but also by various methods. For example, the step sensor 39 may detect whether the foot is removed from one of the step portions 11L and 11R of the vehicle body, and when it is detected, the getting-off assist start trigger may be generated. Further, an optical sensor disposed at the rear portion of the vehicle body 12 may detect whether one foot is moved backward, and when it is detected, the getting-off assist start trigger may be generated.

Next, the control device 46 notified of the getting-off assist start trigger changes a target posture angle according to a profile (S102). Here, the profile is determined depending on a vehicle speed at the time when the control device 46 receives the getting-off assist start trigger, that is, when the getting-off assist control is started. Specifically, the target posture angle is changed so as to change smoothly. Further, when the passenger gets off the vehicle on the rear side thereof, the target posture angle is an angle at which the vehicle is inclined backward, and when the passenger gets off the vehicle on the front side thereof, the target posture angle is an angle at which the vehicle is inclined forward.

Figure 6:
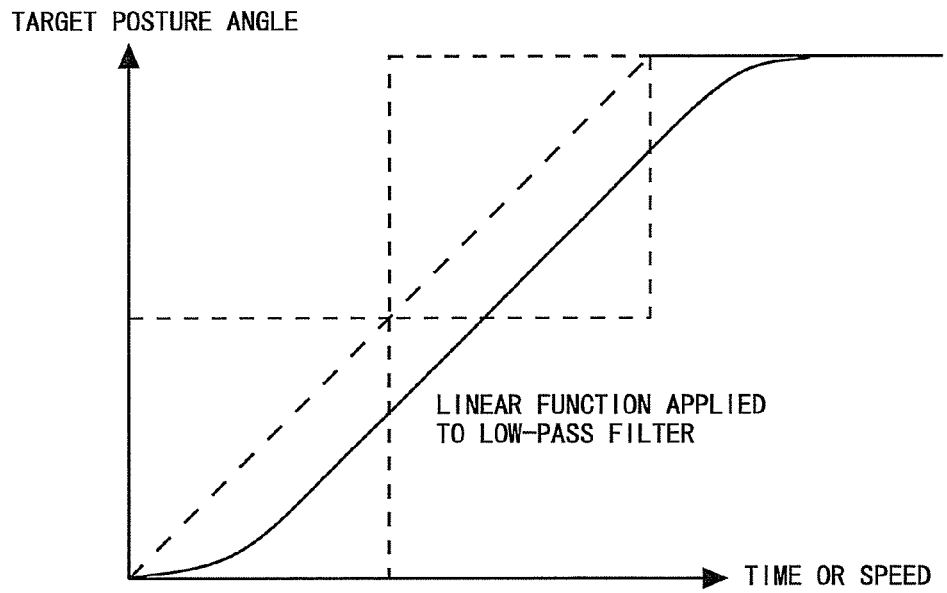
FIG. 6 is a graph showing an example of a profile for the control of the coaxial two-wheel vehicle according to the first embodiment of the present invention.
Figure 7:
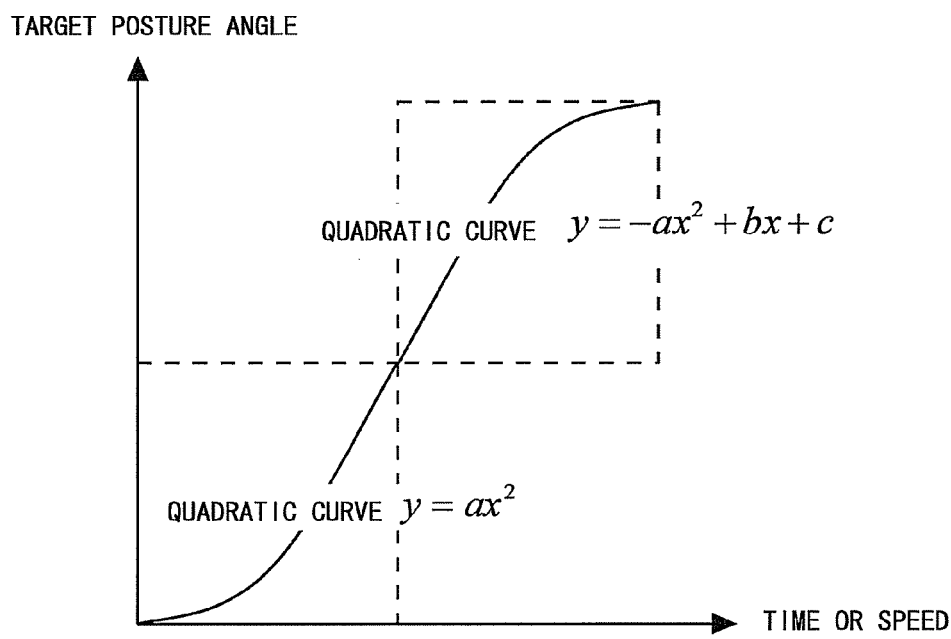
FIG. 7 is a graph showing an example of a profile for the control of the coaxial two-wheel vehicle according to the first embodiment of the present invention.

The target posture angle may be changed so that an angular change is simply linearly proportional to a time change, but the posture angular velocity changes in a discontinuous manner, which gives an undesirable impact to the passenger. In order to eliminate the discontinuity of the posture angular velocity and avoid the undesirable impact, it is preferable to apply a digital low-pass filter to data to make the target posture angle change smoothly and continuously, to thereby prevent the target posture angle from changing linearly as shown in FIG. 6. Further, the target posture angle may be changed by connecting a plurality of quadratic or higher order curves as shown in FIG. 7.

In this case, the changed target posture angle is set to be smaller than an angle (backward limit inclination angle) at which a part of the vehicle body, which is positioned on the rear side of the wheels, is brought into contact with the ground. This is because the vehicle may overturn when the target posture angle is set to be larger than the backward limit inclination angle. Note that, when the passenger gets off the vehicle on the front side thereof, the target posture angle is set to be smaller than an angle (forward limit inclination angle) at which a part of the vehicle body, which is positioned on the front side of the wheels, is brought into contact with the ground.

When the target posture angle is increased and the backward inclination angle (or forward inclination angle) of the vehicle is increased accordingly, the center of gravity of each of the vehicle and the passenger is located backward (forward) of the wheels, thereby applying a brake to the vehicle. Particularly, in the case of a coaxial two-wheel vehicle having a handle provided on the front side of a passenger, the handle presses the body of the passenger backward. As a result, the center of gravity of the passenger is inevitably moved backward, and the center of gravity of each of the vehicle and the passenger is located backward of the wheels.

In this case, in a state where the coaxial two-wheel vehicle 10 is stopped, when the control device 46 is notified of the getting-off assist start trigger, the vehicle travels forward a small distance and is then braked. Note that, in the graphs shown in FIGS. 6 and 7, the axis of abscissa may indicate time or speed. Assuming that the axis of abscissa indicates the speed, as the acceleration increases, the vehicle is inclined backward more rapidly and a larger brake force is applied thereto.

As described above, in the case where the control device 46 increases the target posture angle, the position of the center of gravity is moved backward when the passenger gets off the vehicle on the rear side thereof, and the position of the center of gravity is moved forward when the passenger gets off the vehicle on the front side thereof, thereby applying a brake to the vehicle. Thus, the angular velocity of the drive motors for driving the wheels decreases. Then, the angular velocity of each of the drive motors is temporarily reduced to a negative value below zero, that is, the drive motors are reversely rotated.

The control device 46 determines whether the angular velocity of each of the drive motors is equal to or smaller than zero (S103). When determining that the angular velocity of each of the drive motors is equal to or smaller than zero, the control device 46 shifts to the subsequent control step S104.

In the control step S104, the control device 46 stops the vehicle balance control (that is, posture control), and executes only speed control of left and right drive motors. Specifically, since the vehicle speed is approximately zero when the vehicle shifts to the control step S104, the control device 46 executes control for maintaining the vehicle speed at approximately zero. Accordingly, even if a force for moving the vehicle relatively forward by kicking with his/her foot (supporting leg) placed on the vehicle acts due to reaction when the passenger thrusts his/her foot (grounding leg) backward, the control for maintaining the vehicle speed at approximately zero prevents the vehicle from traveling forward. Thus, a force necessary for supporting the body of the passenger is supplemented. If the control for the drive motors is stopped, a reaction force for receiving and suppressing the force for moving the vehicle relatively forward by kicking with the supporting leg does not act. Thus, the vehicle is put into an idle state. In this case, the passenger feels uncomfortable, as if the step on which the supporting leg is placed falls out.

Figure 8:
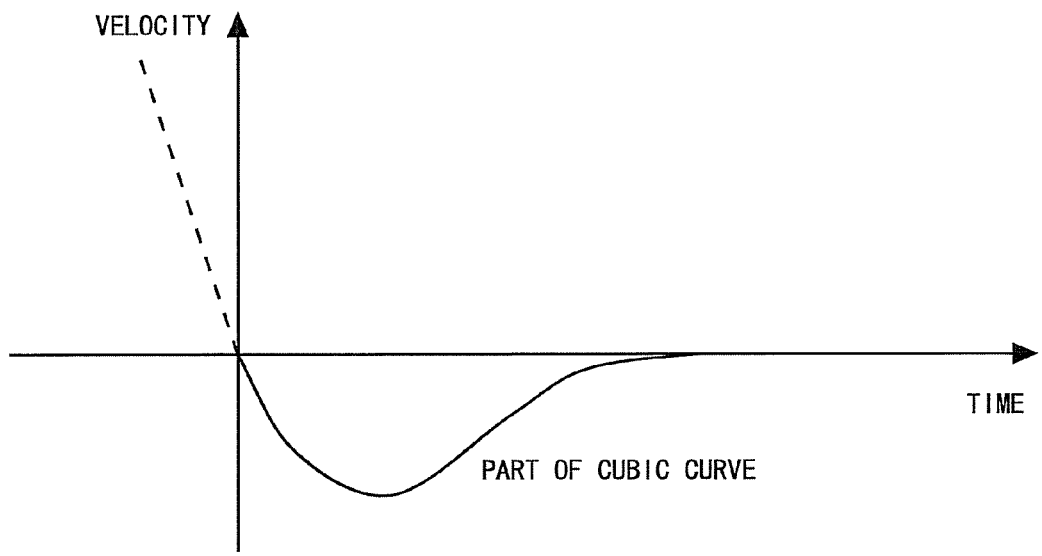
FIG. 8 is a graph showing an example of a profile for the control of the coaxial two-wheel vehicle according to the first embodiment of the present invention.
Figure 9:
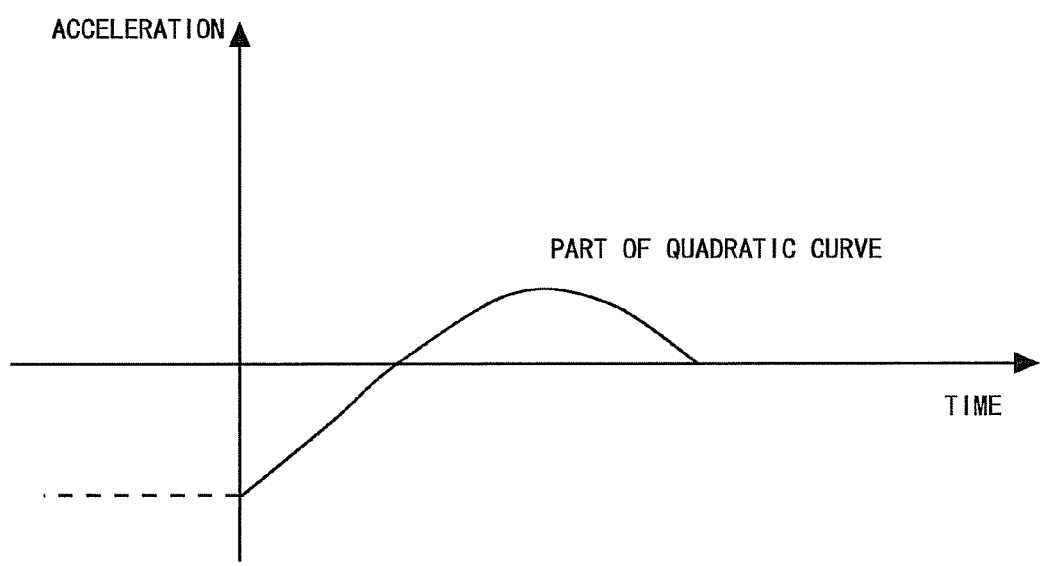
FIG. 9 is a graph showing an example of a profile for the control of the coaxial two-wheel vehicle according to the first embodiment of the present invention.

Note that, in the control step S104, even if the angular velocity is simply maintained at zero, the acceleration becomes discontinuous, which causes an undesirable impact on the supporting leg of the passenger. Accordingly, it is preferable to control the angular velocity of each of the drive motors so that the angular velocity changes according to a quadratic or higher order curve to become zero. FIG. 8 is a graph obtained when the angular velocity of each of the drive motors is changed according to a cubic curve. In this case, FIG. 9 is a graph showing a change in acceleration of the drive motors. The acceleration changes smoothly, which enables the passenger to continue the getting-off operation with a natural feeling.

The control device 46 monitors the output from the step sensor 39 in the state where the control step S104 is executed, and determines whether both feet of the passenger are removed from the step portions 11L and 11R (S105). At this time, the optical sensor disposed at the rear portion of the vehicle body 12 may detect whether one foot is moved backward, to thereby detect whether both feet of the passenger are removed from the steps of the vehicle. When determining that both feet of the passenger are removed from the step portions 11L and 11R of the vehicle, the control device 46 completely shuts off the torque of each of the drive motors, thereby stopping the control of the drive motors (S106).

As described above, in the control method according to the present invention, the inclination angle of each of the steps is first increased during the getting-off operation. Further, when the rotational speed of each of the motors for driving the wheels is inverted, the balance control, that is, the feedback control of the posture is stopped, and the vehicle shifts to a mode for controlling only the number of revolutions of the motors. Furthermore, after it is detected that the feet are removed from the left and right steps, the power of each of the motors is turned off to stop the rotational control of the motors.

The getting-off operation of the passenger is assisted by the control, thereby enabling the passenger to perform the getting-off operation without taking an unnatural posture. Further, it is possible to prevent the coaxial two-wheel vehicle from being unbalanced when the passenger gets off the vehicle, thereby preventing the vehicle from colliding with the foot of the passenger. Furthermore, even when the vehicle speed is equal to or higher than a predetermined speed, a brake is applied to the vehicle and the passenger by performing appropriate vehicle control according to the speed in the front-and-rear direction, thereby enabling the passenger to get off the vehicle at a safe speed in a safe posture.

Furthermore, in the case of executing the control of the number of revolutions of the motors while stopping the balance control, control for changing the number of revolutions smoothly to become zero is carried out in accordance with the variation in number of revolutions (i.e., acceleration) obtained immediately before the control, which contributes to supporting the feet of the passenger so that the passenger can move the center of gravity of himself/herself without feeling any anxiety, while preventing sudden braking and alleviating the impact on the feet of the passenger.

Second Embodiment

According to the control method of the first embodiment of the present invention, in the case where the getting-off assist start trigger is actuated when the vehicle together with the passenger is traveling backward, if the passenger gets off the vehicle on the rear side thereof, the passenger feels like being thrown out backward.

Figure 10:
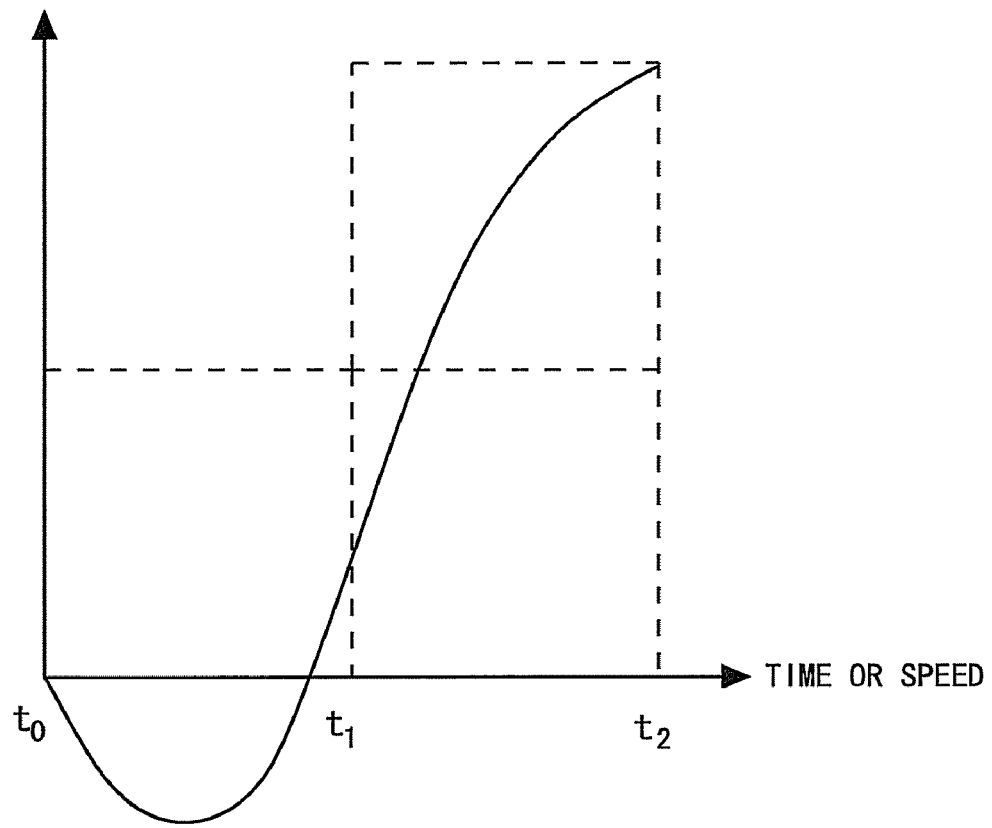
FIG. 10 is a graph showing an example of a profile for control of a coaxial two-wheel vehicle according to a second embodiment of the present invention.

A second embodiment of the present invention is characterized in that a profile for backward traveling as shown in FIG. 10 is used to suppress such an undesirable feeling. Specifically, in the case where the vehicle speed is a negative value (that is, in the case where the vehicle is traveling backward) when the getting-off assist start trigger is actuated, the control device 46 temporarily sets the target posture angle as a forward inclined angle to brake the body of the passenger and the vehicle body so that the body of the passenger and the vehicle body are inclined forward. After that, the control device 46 increases the target posture angle so as to incline the vehicle backward, and the passenger gets off the vehicle on the rear side thereof.

Specifically, assuming that the getting-off assist start trigger is actuated when $t=t_0$, the control device 46 determines the vehicle speed. When determining that the vehicle speed is a negative value, the control device 46 adjusts the target posture angle in the negative direction, that is, adjusts the target posture angle so that the vehicle is inclined forward. Then, when a predetermined time or a time $t_1$, which is determined based on predetermined criteria for judgment, is reached, the control device 46 sets the angle so that the vehicle is inclined backward and controls the angle to gradually increase. Then, a predetermined time or a time $t_2$, which is determined based on predetermined criteria for judgment, is reached, the target posture angle reaches a predetermined maximum value.

Note that, also when the passenger gets off the vehicle on the front side thereof in the case where the vehicle is traveling forward, the target posture angle is temporarily inclined backward and is then increased to incline the vehicle forward in the same manner as described above.

Thus, when the traveling direction of the vehicle coincides with the direction in which the passenger gets off the vehicle, the target posture angle is set so that the vehicle is inclined in a direction opposite to the traveling direction of the vehicle, and then the target posture angle is set so that the vehicle is inclined in the same direction as the traveling direction of the vehicle, thereby suppressing the undesirable feeling of being thrown out against the traveling direction of the vehicle.

Here, not only by controlling the posture of the vehicle and the motors, but also by providing a warning tone generating means that causes a system to generate a warning tone when the getting-off assist control is started, a passenger's intention to get off the vehicle is increased, and thus the passenger can smoothly get off the vehicle.

Further, the following effects can be obtained. That is, not only in the case of the getting-off assist start trigger according to the passenger's intention to get off the vehicle, but also in the case where the control device 46 needs to complete the control after detecting any abnormalities, the getting-off assist control is started to guide the passenger to get off the vehicle safely, thereby reducing a damage to the coaxial two-wheel vehicle 10.

Furthermore, when the passenger is in panic, the getting-off assist control can be used as a break to alleviate the panic. As a result, even when a beginner, who is not used to operating the coaxial two-wheel vehicle, loses control of the vehicle and the vehicle is likely to get out of control, the person can stop the vehicle safely to get off the vehicle.

INDUSTRIAL APPLICABILITY

The present invention relates to a coaxial two-wheel vehicle including two wheels disposed on the same axis center line, and a method of controlling the same. In particular, the present invention can be applied to a coaxial two-wheel vehicle with a person riding thereon to perform a traveling operation, and a method of controlling the same.

The invention claimed is:

1. A coaxial two-wheel vehicle including step portions on which feet of a passenger are placed and an operating portion capable of operating at least back-and-forth movements, to move with the passenger riding thereon, the coaxial two-wheel vehicle comprising:
a control device that, when the passenger gets off the vehicle, executes a getting-off assist control to increase an inclination angle of each of the step portions with respect to a direction in which the passenger gets off the vehicle.

2. The coaxial two-wheel vehicle according to claim 1, wherein, when the step portions are inclined in a front-and-rear direction by the operating portion, the control device controls the coaxial two-wheel vehicle to move in a direction in which the step portions are inclined.

3. The coaxial two-wheel vehicle according to claim 1, wherein, when a moving direction of the coaxial two-wheel vehicle coincides with a direction in which the passenger gets off the vehicle, the step portions are inclined to a side of the moving direction after being inclined in a direction opposite to the moving direction.

4. The coaxial two-wheel vehicle according to claim 1, further comprising a getting-off switch that generates a getting-off control start trigger signal,
wherein the control device detects that the passenger gets off the vehicle, in response to the getting-off control start trigger signal supplied from the getting-off switch, and executes the getting-off assist control.

5. The coaxial two-wheel vehicle according to claim 1, further comprising a step sensor that detects whether the feet of the passenger are placed on the step portions,
wherein the control device detects a getting-off operation of the passenger based on a detection result of the step sensor, and executes the getting-off assist control.

6. The coaxial two-wheel vehicle according to claim 1, wherein the control device changes a target posture angle to increase the inclination angle of each of the step portions.

7. The coaxial two-wheel vehicle according to claim 6, wherein the control device changes the target posture angle smoothly by using a digital low-pass filter to increase the inclination angle of each of the step portions.

8. The coaxial two-wheel vehicle according to claim 6, wherein the control device changes the target posture angle along a curve obtained by combining a plurality of quadratic or higher order curves to increase the inclination angle of each of the step portions.

9. The coaxial two-wheel vehicle according to claim 1, wherein, when the control device detects that a speed of the coaxial two-wheel vehicle is zero, the control device stops a posture control and controls a drive motor for wheels to maintain the coaxial two-wheel vehicle in a stopped state.

10. The coaxial two-wheel vehicle according to claim 9, wherein the control device controls the drive motor to change a driving speed along a quadratic or higher order curve so that the coaxial two-wheel vehicle is brought into a completely stopped state.

11. The coaxial two-wheel vehicle according to claim 1, further comprising a sensor that detects that both feet of the passenger are removed from the step portions,
wherein, when the control device detects that both feet of the passenger are removed from the step portions, the control device stops controlling a drive motor for wheels.

12. A method of controlling a coaxial two-wheel vehicle including step portions on which feet of a passenger are placed and an operating portion capable of operating at least back-and-forth movements, to move with the passenger riding thereon, the method comprising:
detecting that the passenger gets off the vehicle; and
executing a getting-off assist control to increase an inclination angle of each of the step portions with respect to a direction in which the passenger gets off the vehicle, when it is detected that the passenger gets off the vehicle.

13. The method of controlling a coaxial two-wheel vehicle according to claim 12, further comprising, when the step portions are inclined in a front-back direction by the operation portion, controlling the coaxial two-wheel vehicle to move in a direction in which the step portions are inclined.

14. The method of controlling a coaxial two-wheel vehicle according to claim 12, wherein, when a moving direction of the coaxial two-wheel vehicle coincides with a direction in which the passenger gets off the vehicle, the step portions are inclined to a side of the moving direction after being inclined in a direction opposite to the moving direction.

15. The method of controlling a coaxial two-wheel vehicle according to claim 12, wherein the inclination angle of each of the step portions is increased by changing a target posture angle.

16. The method of controlling a coaxial two-wheel vehicle according to claim 15, wherein the target posture angle is changed smoothly by using a digital low-pass filter to increase the inclination angle of each of the step portions.

17. The method of controlling a coaxial two-wheel vehicle according to claim 15, wherein the inclination angle of each of the step portions is increased by changing the target posture angle along a curve obtained by combining a plurality of quadratic or higher order curves.

18. The method of controlling a coaxial two-wheel vehicle according to claim 12, wherein, when it is detected that a speed of the coaxial two-wheel vehicle is zero, a posture control is stopped and a drive motor for wheels is controlled to maintain the coaxial two-wheel vehicle in a stopped state.

19. The method of controlling a coaxial two-wheel vehicle according to claim 18, wherein the drive motor is controlled to change a driving speed along a quadratic or higher order curve so that the coaxial two-wheel vehicle is brought into a completely stopped state.

20. The method of controlling a coaxial two-wheel vehicle according to claim 12, further comprising, when it is detected that both feet of the passenger are removed from the step portions, stopping control of a drive motor for wheels.

* * * * *